J. A. TOUHILL.
Balanced Slide-Valves

No. 149,359. Patented April 7, 1874.

UNITED STATES PATENT OFFICE.

JOHN A. TOUHILL, OF PITTSTON, PENNSYLVANIA, ASSIGNOR TO HIMSELF, R. J. WISNER, AND THEODORE STRONG, OF SAME PLACE.

IMPROVEMENT IN BALANCED SLIDE-VALVES.

Specification forming part of Letters Patent No. 149,359, dated April 7, 1874; application filed March 4, 1874.

*To all whom it may concern:*

Be it known that I, JOHN A. TOUHILL, of Pittston, in the county of Luzerne and State of Pennsylvania, have invented certain new and useful Improvements in Balanced Slide-Valves; and I do hereby declare that the following is a full, clear, and exact description thereof, reference being had to the accompanying drawings and to the letters of reference marked thereon, which form part of this specification.

The nature of my invention consists in two slide-valves working on opposite sides of steam-ports, held in place by bolts and springs, and permitting the steam to press equally on all sides of the valve, making a balanced valve.

In order to enable others skilled in the art to which my invention appertains to make and use the same, I will now proceed to describe its construction and operation, referring to the annexed drawing, in which—

Figure 1:
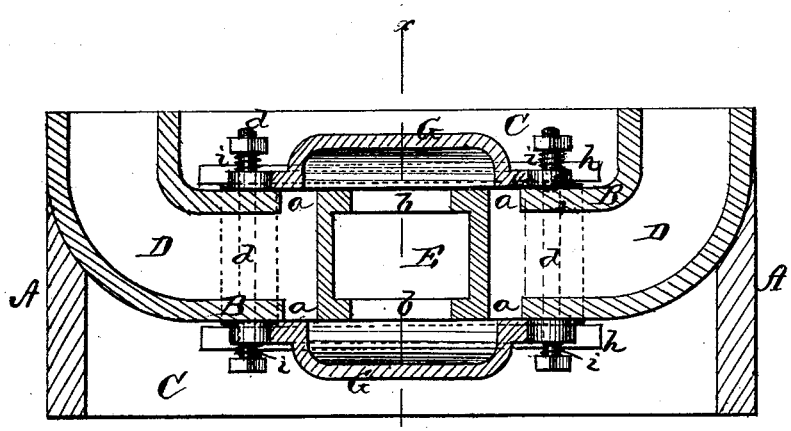
Figure 2:
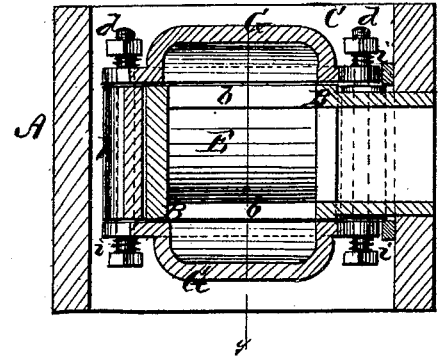

Figure 1 is a longitudinal section, and Fig. 2 a transverse section, of my steam-chest and double valve.

A represents a steam-chest, provided with two valve-seats, B B. C is the steam-space in the chest. Each seat B is provided with two steam-ports, $a\ a$, and one exhaust-port, $b$, as usual. All the steam-ports $a\ a$ lead into ports or passages D D, one to each end of the cylinder, each of said passages thus having a double port, through which the steam enters. The exhaust-ports $b\ b$ lead into a common exhaust, E. G G represent the two slide-valves, constructed in the usual manner, and arranged one on each seat, B. These valves are connected by means of bolts $d\ d$ passing through projections $e\ e$ on the valves, and between said projections are supports $h\ h$, through which the bolts also pass. Upon each bolt $d$, at one or both ends, is a spring, $i$, or its equivalent, to permit the valves to open and discharge condensed water from the cylinder.

The chest and valve thus constructed, it will be seen, has a double area of steam-port, which allows the steam to enter the cylinder just twice as soon as the ordinary valve. The steam presses on all sides alike, so that when the valve is once fitted properly there is little or no pressure on the face of the valve, and, consequently, little or no wear.

The connecting-bolts with springs allow the condensed water in the cylinder to escape when necessary, thus preventing the bursting of the cylinder.

Having thus fully described my invention, what I claim as new, and desire to secure by Letters Patent, is—

The valves G G, arranged upon seats B B, in combination with bolts $d\ d$ and springs $i\ i$, substantially as and for the purpose set forth.

In testimony that I claim the foregoing as my own I affix my signature in presence of two witnesses.

JOHN A. TOUHILL.

Witnesses:
R. J. WISNER,
SMITH SUTHERLAND.